United States Patent Office 2,779,061
Patented Jan. 29, 1957

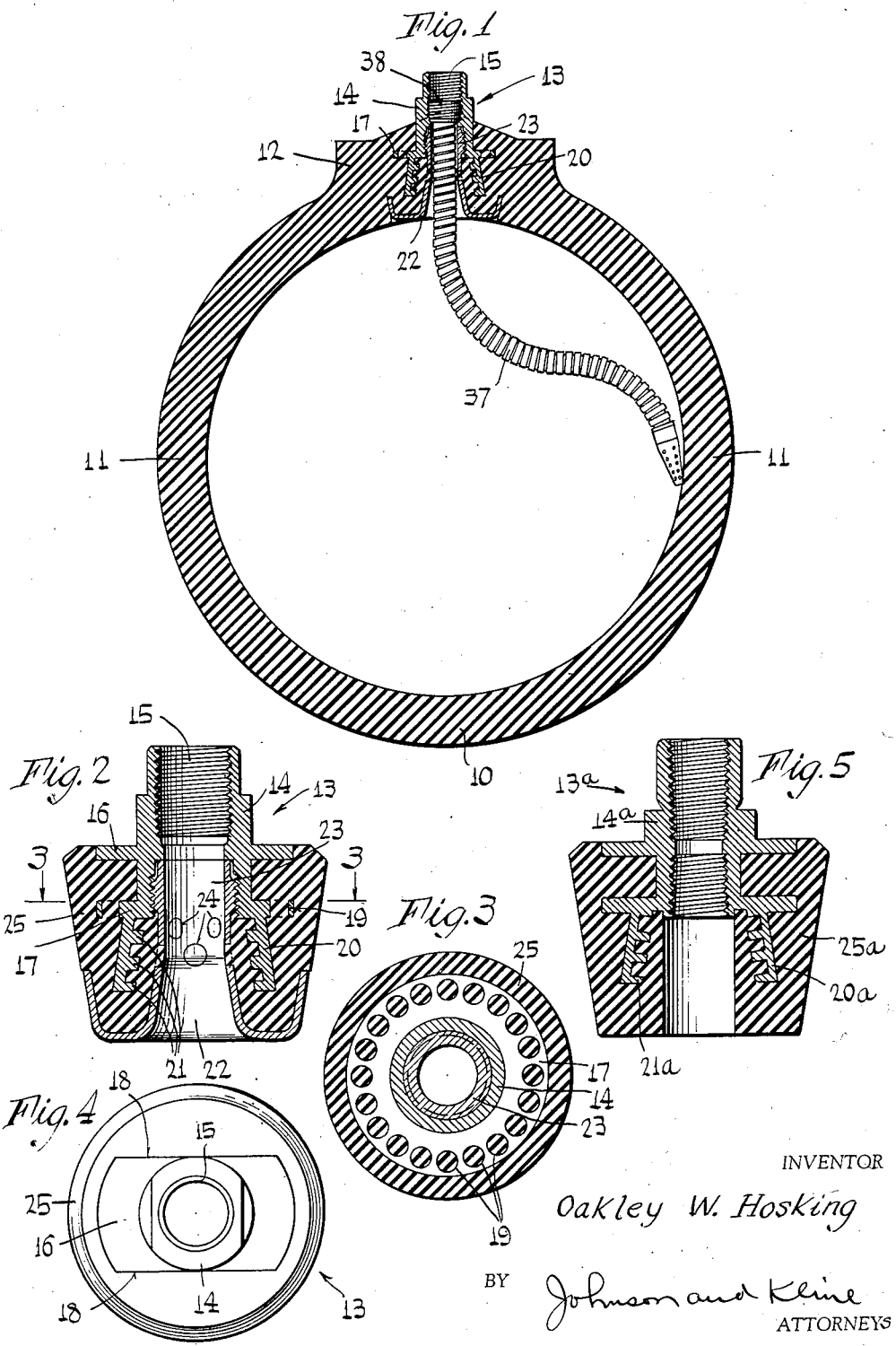
Jan. 29, 1957 — O. W. HOSKING — 2,779,061
TIRE-CURING BAG AND METHOD OF MAKING THE SAME
Filed Oct. 30, 1952 — 2 Sheets-Sheet 1
INVENTOR
Oakley W. Hosking
BY Johnson and Kline
ATTORNEYS Jan. 29, 1957 O. W. HOSKING 2,779,061
TIRE-CURING BAG AND METHOD OF MAKING THE SAME
Filed Oct. 30, 1952 2 Sheets-Sheet 2
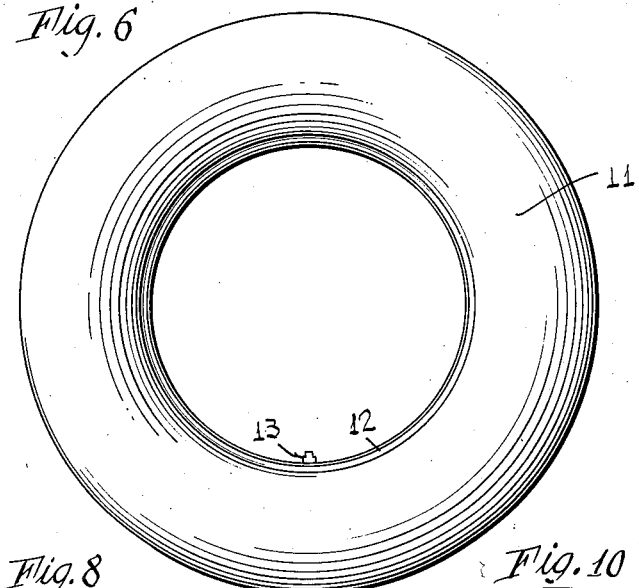
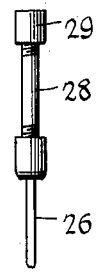
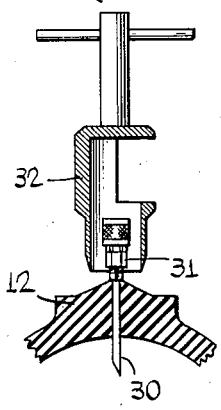
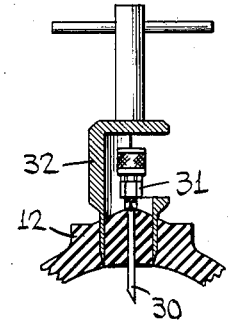
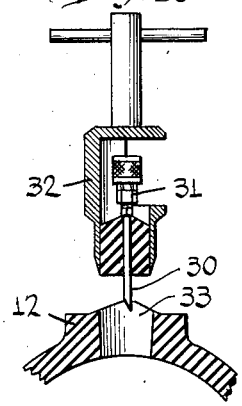
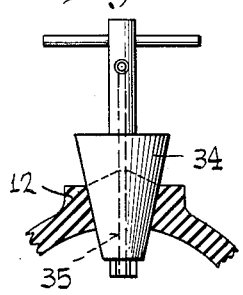
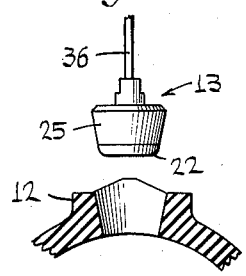
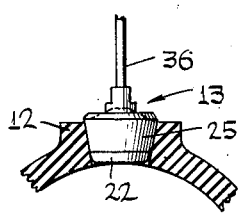
INVENTOR
Oakley W. Hosking
BY Johnson and Kline
ATTORNEYS

2,779,061
TIRE-CURING BAG AND METHOD OF MAKING THE SAME

Oakley W. Hosking, Monroe, N. Y., assignor to Monroe Bag Valve Corporation, Monroe, N. Y., a corporation of New York Application October 30, 1952, Serial No. 317,731

11 Claims. (Cl. 18—45)

This invention relates to tire-curing bags and methods of making the same.

In the manufacture of pneumatic rubber tires it is common practice to build up the tire casing over a rubber form having roughly the shape of a tire, called a tire-curing bag. Usually these bags are fabricated by extruding rubber in a straight tubular shape having generally the desired cross section of the tire-curing bag, cutting off the extruded rubber into appropriate lengths, tapering or flaring the ends of the cut sections and bringing and cementing the ends together in telescoping relation to form an annulus of uncured rubber, having roughly the shape of a tire. Heretofore, to provide for inflation of the tire curing bag, a hole was made in the inner wall of the annulus and a tubular structure like a valve stem inserted in the hole, said stem having a flange at its inner end and being externally threaded to enable it to carry a nut and washer whereby the wall of the bag could be tightly clamped to provide a seal.

This valve stem was utilized to inflate the bag during the cold forming and curing stages of its fabrication, and was then regularly employed during the use of the bag in the forming and curing of tires. In such use the tire-curing bag is inflated and deflated as part of the process involved in the manufacture of the tire casing.

The normal useful life span of such a tire-curing bag is quite limited, and on an average a bag could be used for approximately fifty cures, that is, the various operations involving the manufacture of fifty rubber tires.

The location of most failures in these bags was at the valve stem, where an imperfect joint between the metal stem and the rubber wall would cause rupture of the wall or otherwise render the tire bag unfit for further service.

The most prevalent defects and disadvantages in these prior tire-curing bags as set forth above are overcome by the present invention, and an object of the invention is to provide an improved tire-curing bag and method of making the same, in which a sturdy, failure-resistant connection is effected between the valve stem and the wall of the tire bag to greatly increase the useful life of the bag. By practicing the invention it is possible to have the tire bags last for substantially over a hundred cures, thereby more than doubling the useful life of which tire bags were previously capable.

In accomplishing this, the invention provides a novel method and tire bag structure characterized by the cutting of a hole in the inner wall of the uncured tire bag, and by the inserting in said hole of a prefabricated assembly comprising a rubber annulus and an imbedded rigid tube or valve stem aligned with and extending into the annulus. The said annulus and stem assembly is positioned in the cut hole with the walls of the annulus and hole in intimate contact with each other, and thereafter the tire bag and assemblage is cured to provide a single or unitary rubber wall structure in which the valve stem is firmly imbedded and interlocked. By the present invention, which provides for separate fabrication of the assembly constituted of the rubber annulus and imbedded rigid tube or valve stem, it is possible to so organize and construct the valve stem as to secure an extremely sturdy, failure resistant interlock, this being accomplished by molding the annulus about flanges or projections especially provided on the stem for interlocking purposes. In the process of curing the tire bag and the annulus of the inserted assembly, the walls of the tire bag and annulus become securely bonded to and merged with each other, resulting in a unitary or integral structure. Accordingly failure of the tire bag at the valve stem is very materially lessened if not completely eliminated; ultimate failure of tire bags made according to the invention has been found to involve factors not associated with the attachment of the valve stem to the bag wall.

A further object of the invention is to provide an improved tire-curing bag and method of making the same by which the life of the bag is greatly increased, said bag and method being extremely simple and economical to fabricate or practice.

A feature of the invention resides in the organization by which, after ultimate failure of the tire bag, the flanged tubes or valve stems may be salvaged and reused to fabricate new assemblies for insertion into new uncured tire bags.

Other features and advantages will hereinafter appear.

In the accompanying drawings:

Figure 1 is a cross sectional view of a tire-curing bag made in accordance with the invention, the valve stem structure being shown in axial section.

Fig. 2 is an axial sectional view of an assembly of rigid tube or valve stem and rubber annulus.

Fig. 3 is a horizontal section taken on line 3—3 of Fig. 2.

Fig. 4 is a top view of the valve stem assemblage shown in Fig. 2.

Fig. 5 is an axial sectional view of an assembly of valve stem and annulus, illustrating a modified form of the invention.

Fig. 6 is a side elevational view of a tire bag made in accordance with the invention.

Fig. 7 is a side elevational view of a needle such as is passed through the inner wall of an uncured tire bag for purposes of inflating and forming the bag.

Figs. 8, 9 and 10 are sectional views showing successive stages in the operation of cutting a hole in the inner wall of the uncured tire bag.

Fig. 11 is a view partly in section and partly in elevation illustrating the use of a forming tool to accurately size the cut hole.

Figs. 12 and 13 illustrate two steps in the operation of inserting the valve stem assemblage into the hole cut in the tire bag.

Referring to Figs. 1, 2 and 6 of the tire-curing bag of this invention comprises a tubular annulus having roughly the shape of a tire, with a rounded outer wall 10, rounded side walls 11 and a thickened inner wall 12, making up a substantially circular cross section. Embedded in the inner wall 12 is a rigid tube or valve stem 13, having a tubular body 14 provided with internal threads 15 and having intermediate its ends a pair of outwardly extending spaced flanges 16 and 17. The flange 16 may be in the form of a disk with flatted sides 18, while the flange 17 is preferably completely circular, and is provided with circular apertures 19 disposed in a circle closely adjacent the peripheral edge of the flange. Extending axially from the flange 17 is an annular conical flange 20 having but a slight taper, said flange being provided with a plurality of spaced inwardly extending annular shoulders or ribs 21.

The portion of the body 14 located between the flanges 16 and 17 is provided with internal screw threads for mounting an annular skirt 22. As shown in Fig. 2 the skirt 22 is substantially channel-shaped in cross section, extending along both the inside and outside of the flange 20 in spaced relation thereto, and having a threaded tubular extension 23 which is screwed into the internal screw threads in the bore of the body 14. Preferably the extension 23 of the skirt 22 has a plurality of openings or apertures 24 which contribute to the interlock between the rubber and the valve stem, as will be hereinafter brought out in detail.

In accordance with the present invention, prior to the insertion of the valve stem 13 in the tire bag a rubber annulus 25 is molded about the valve stem, said annulus being substantially frustro-conical in shape and having portions occupying the spaces between the flanges 16 and 17 and between the flange 20 and the skirt 22. When the rubber annulus is molded around the valve stem 13 the rubber material occupies the apertures 19 in the flange 17 and also the apertures 24 in the skirt 22, and I have found that with such a construction a sturdy rupture-resistant interlock is provided between the annulus 25 and the valve stem 13. Such interlock provides for an effective seal to prevent leakage of fluid past the valve stem even though there is no actual bond existing between the rubber of the annulus and the metal of the valve stem. As will be hereinafter brought out, the assembly shown in Fig. 2 is inserted in a hole in the inner wall of the tire bag, and the bag, then put through a curing operation whereby the annulus 17 is bonded to and merges with the walls of the tire bag to provide a unitary integral rubber structure as depicted in Fig. 1.

As a consequence, a pressure-tight connection which is able to withstand heavy working stresses is established between the valve stem 13 and the inner wall 12 of the tire bag. In carrying out the method of the operation, referring to Figs. 7 through 13, the following steps may be advantageously employed: In Fig. 7 a hollow needle 26 is shown mounted on a coupling to which a pipe nipple 28 is fastened, said nipple having a collar or connector fitting 29. The needle 26 is forced through the inner wall of the uncured tire bag, and the fitting 29 connected with a supply of compressed air. The tire bag is inflated to a slight extent, preferably while being supported on a mandrel. The bag is then placed in a cold mold and inflated to a greater pressure, to cold press and shape the bag. The cold pressing time under high pressure may advantageously be on the order of fifteen minutes.

After this the high pressure is released and then the bag is removed from the mold and the needle 26 withdrawn and replaced by a needle 30 mounted on a fitting 31 containing a check valve (not shown) such as is commonly employed in air lines and the like. The bag is again partially inflated and then a hole is cut in the inner wall of the bag by a cutting tool 32, Figs. 8, 9 and 10. The cutting is done preferably in a zone extending around and spaced from the needle 30 so that when the plug is removed from the tire-curing bag it will contain the needle 30. Successive stages in the cutting out of this plug are shown in Figs. 8, 9 and 10, the latter figure showing the hole, indicated at 33, in the inner wall of the tire bag.

It will be understood that the purpose of replacing the needle 26 with the needle 30 is to provide a check valve by which a certain amount of air pressure may be maintained in the bag. Instead of substituting needles as above mentioned, it would serve the purposes of the invention to merely insert a check valve in the needle 26 after the bag has been removed from the cold mold. The use of two needles is merely one way of conveniently incorporating a check valve, to enable pressure to be maintained and permit the cutting tool 32 to easily cut out the plug from the inner wall of the bag.

Following this, I shape the hole 33 accurately by means of a forming tool 34, Fig. 11, which is inserted into the hole a predetermined extent, said tool having a frustro-conical shape and being provided with a bore 35 through which air may be forced into the tire bag to prevent it from collapsing. I prefer to allow the forming tool to remain in its proper forming position for a period of at least five minutes, and if desired alcohol may be used as a lubricant while inserting the forming tool, and also while the cutter 32 is being used. After the shaping of the hole by the tool 34 the tool is removed and the assembly comprising the annulus 25 and the valve stem 13 inserted into the hole, with the mating surfaces of the annulus and hole being brought into intimate contact with each other as shown in Figs. 12 and 13. Preferably during the insertion of the valve stem assembly, the bag is inflated slightly through a pipe connection 36 made to the valve stem 13 and the assembly manipulated with a back and forth twisting action as it is being inserted.

I prefer to prepare the valve stem assembly prior to its insertion into the opening 33 of the tire bag by applying two coats of cement, a first, heavy coat applied at least twenty-four hours before installing the valve assembly and a second light coat applied not less than four hours before installing the valve.

After the valve assembly has been installed, the area of the inner wall of the tire bag around the valve should be cleaned and cemented, and a small piece of sheet stock applied to this area for smoothing purposes. Approximately a half hour following this the tire bag should be placed in a suitable mold and thoroughly cured whereupon the rubber annulus 25 will merge and become integral with the inner wall 12 of the tire bag.

In the use of the tire bag it is desirable to remove moisture from the inside, and in accordance with this invention a novel, improved flexible pigtail tube 37 is provided having a diameter enabling it to be inserted through the valve stem 13, and having a threaded end 38 adapted to be screwed into the internal threads 15 of the valve stem. The threaded end 38 of the pigtail 37 may have a hexagonal shaped bore to admit an Allen wrench for tightening or loosening the pigtail.

By actual extensive tests I have determined that a tire-curing bag having an imbedded valve stem as above set forth will last more than twice as long as prior tire-curing bags in which the valve stem is clamped upon the inner wall of the tire bag. Even though no actual bond exists between the rubber of the annulus 25 and the metal of the valve stem 13 the interlock effected by the flanges and skirt of the valve stem is effective in preventing leakage of fluid past the stem and failure of the wall of the tire bag at this point. Fluid pressure on the rubber occupying the openings 24 tends to force the rubber between the skirt 22 and the flange 20 radially outward, holding said rubber tightly against the ribs 21 of the flange and insuring a tight seal. The curing of the tire bag results in the annulus 25 merging and becoming integral with the inner wall 12 of the tire bag so that there will be no rupture or failure at this point during the use of the bag. The annulus 25 may be partially uncured or may be substantially wholly cured prior to its incorporation in the uncured tire bag as outlined above.

When the tire bag is placed in use the fluid pressure on the rubber occupying the holes 24 of the skirt 22 may cause an outward displacement of said rubber, and the fluid may creep between the rubber and the skirt 22. Such action will tend to force the rubber more tightly against the flange 20 and have the effect of making a still tighter seal.

In Fig. 5 a modified form of assembly 13a of rubber annulus and rigid tube is shown, this assembly being devoid of the skirt 22 shown in Fig. 2, but being otherwise substantially the same. In Fig. 5 the rubber annulus is indicated at 25a and the rigid tube indicated at 14a, these parts being substantially the same as described above with the exception that the diameter of the body and threaded bore of the tube is smaller since there is no necessity for accommodating the skirt 22. I have found that the assembly shown in Fig. 5, which omits the skirt 22, is still extremely effective in producing tire-curing bags of greatly increased life, as compared with prior bag constructions, because of the effective seal provided by virtue of the fluid pressure on the inner walls of the annulus 25a holding said walls tightly against the ribs 21a of the flange 20a in interlocking engagement.

My improved tire-curing bag and method as above set forth is extremely simple and economical to fabricate and to practice, and effects a very substantial saving in the formation of tires using tire-curing bags as at present employed in the industry.

Variations and modifications may be made within the scope of the claims and portions of the improvements may be used without others.

I claim:

1. The method of making a finished tire-curing bag which includes the steps of cutting a hole in an uncured rubber tire-curing bag, inserting into the hole in alignment therewith and in intimate contact with the walls of the hole a rubber annulus having a rigid tube secured in it and extending at least partially through it, and curing the bag and annulus under heat and pressure to unite these into a unitary rubber structure in a wall of which the said rigid tube is secured and through which it passes at least partially.

2. The method of making a finished tire-curing bag which includes the steps of cutting a hole in an uncured rubber tire-curing bag, positioning a sizing plug in said hole for a predetermined length of time to accurately size the hole, removing said plug and inserting into the hole in alignment therewith and in intimate contact with the walls of the hole a rubber annulus having a rigid tube secured in it and extending at least partially through it, and curing the bag and annulus under heat and pressure to unite these into a unitary rubber structure in a wall of which the said rigid tube is secured and through which it passes at least partially.

3. The method of making a finished tire-curing bag which includes the steps of cutting a tapered hole in an uncured rubber tire-curing bag, inserting into the hole in alignment therewith and in intimate contact with the walls of the hole a frustro-conical rubber annulus having a rigid tube secured in it and extending at least partially through it, and curing the bag and annulus under heat and pressure to unite these into a unitary rubber structure in a wall of which the said rigid tube is secured and through which it passes at least partially.

4. The method of making a finished tire-curing bag which includes the steps of cutting a hole in an uncured rubber tire-curing bag, inserting into the hole in alignment therewith and in intimate contact with the walls of the hole a rubber annulus having a rigid tube secured in it and extending at least partially through it while simultaneously partially inflating the bag, and curing the bag and annulus under heat and pressure to unite these into a unitary rubber structure in a wall of which the said rigid tube is secured and through which it passes at least partially.

5. The method of making a finished tire-curing bag which includes the steps of cutting a hole in an uncured rubber tire-curing bag, inserting into the hole in alignment therewith and in intimate contact with the walls of the hole a partially uncured rubber annulus having a rigid tube secured in it and extending at least partially through it, and curing the bag and annulus under heat and pressure to unite these into a unitary rubber structure in a wall of which the said rigid tube is secured and through which it passes at least partially.

6. The method of making a finished tire-curing bag which includes the steps of passing a needle through a wall of an uncured rubber tire-curing bag, partially inflating the bag through said needle, placing the partially inflated bag in a cold mold, introducing air under high pressure into the bag through the needle while it is in said mold, thereafter deflating the bag, cutting through the wall of the bag in a zone extending around and spaced from the needle, removing the needle and portion of the wall contained within said cut, inserting in the resultant hole in alignment therewith and in intimate contact with the walls thereof a rubber annulus having a rigid tube secured in it and extending at least partially through it, and curing the bag and annulus under heat and pressure to unite these into a unitary rubber structure in a wall of which the said rigid tube is secured and through which it passes at least partially.

7. The method of making a finished tire-curing bag which includes the steps of passing a needle through a wall of an uncured rubber tire-curing bag, partially inflating the bag through said needle, placing the partially inflated bag in a cold mold, introducing air under high pressure into the bag through the needle while it is in said mold, deflating the bag, removing the needle and replacing it with a second needle having a check valve, partially reinflating the bag through the second needle, cutting through the wall of the bag in a zone extending around and spaced from the second needle, removing the second needle and portion of the wall contained within said cut, inserting in the resultant hole in alignment therewith and in intimate contact with the walls thereof a rubber annulus having a rigid tube secured in it and extending at least partially through it, and curing the bag and annulus under heat and pressure to unite these into a unitary rubber structure in a wall of which the said rigid tube is secured and through which it passes at least partially.

8. An air-fitting assembly for a tire-curing bag comprising a rubber annulus having the form of a truncated cone; a rigid tube aligned with and imbedded in said annulus and extending at least partially through the annulus, said tube having a pair of outwardly extending spaced flanges adjacent one end, and having an axially extended flange secured to one of said spaced flanges; a plurality of inwardly extended annular ribs on the annular axially-extended flange; and an annular skirt of substantially channel cross section, secured to the tube and extending along the inside and outside of the axially-extended flange in spaced relation thereto, said rubber annulus occupying the space between the skirt and axially-extended flange, and the space between the first-mentioned flanges to effect interlocking engagement with the said flanges.

9. An air-fitting assembly for a tire-curing bag comprising a rubber annulus having an outside surface engageable with the walls of a hole of said tire-curing bag; and a rigid tube imbedded in the annulus and extending at least partially through the annulus, said annulus being formed with a bore which is aligned with the tube and forming therewith an opening through the annulus, said tube having an inwardly extending annular rib completely imbedded in the annulus and encircling the bore in the annulus whereby the fluid in the bag forces a portion of the annulus adjacent the rib into fluid tight seal with the rib, and in which there is an annular skirt of substantially channel cross section, secured to the tube and extending along the inside and outside of the rib in spaced relation thereto, said skirt containing a portion of said rubber annulus for effecting an interlock between the annulus and the rib.

10. The invention as defined in claim 9 in which the tube has screw threads in its bore and in which the skirt has a threaded extension screwed into the bore of the tube.

11. The invention as defined in claim 9 in which the inner portion of the skirt is provided with openings exposing inner portions of the rubber annulus whereby the inner periphery of the annulus may be subjected to air pressure through said openings, causing the inner portion of the annulus to be forcibly held against the inner surface of said flange.

References Cited in the file of this patent

UNITED STATES PATENTS

| Number | Name | Date |
|---|---|---|
| 1,163,987 | Eggers | Dec. 14, 1915 |
| 1,570,157 | Knepper | Jan. 19, 1926 |
| 1,942,993 | Aultman et al. | Jan. 9, 1934 |
| 2,070,525 | Eberhard | Feb. 9, 1937 |
| 2,120,346 | Becker | June 14, 1938 |
| 2,161,775 | Miller et al. | June 6, 1939 |
| 2,407,768 | Predmore | Sept. 17, 1946 |
| 2,415,063 | Hosking | Jan. 28, 1947 |
| 2,435,466 | Thomas | Feb. 3, 1948 |
| 2,440,144 | Hosking | Apr. 20, 1948 |
| 2,482,469 | Crowley | Sept. 21, 1949 |
| 2,564,662 | Baker | Aug. 21, 1951 |
| 2,566,766 | Green | Sept. 4, 1951 |
| 2,568,848 | Enobnit | Sept. 25, 1951 |
| 2,666,007 | Hovey | Jan. 12, 1954 |